Sept. 27, 1932.  E. R. MORGAN ET AL  1,879,814
CONNECTING ROD
Original Filed July 28, 1930  2 Sheets-Sheet 1
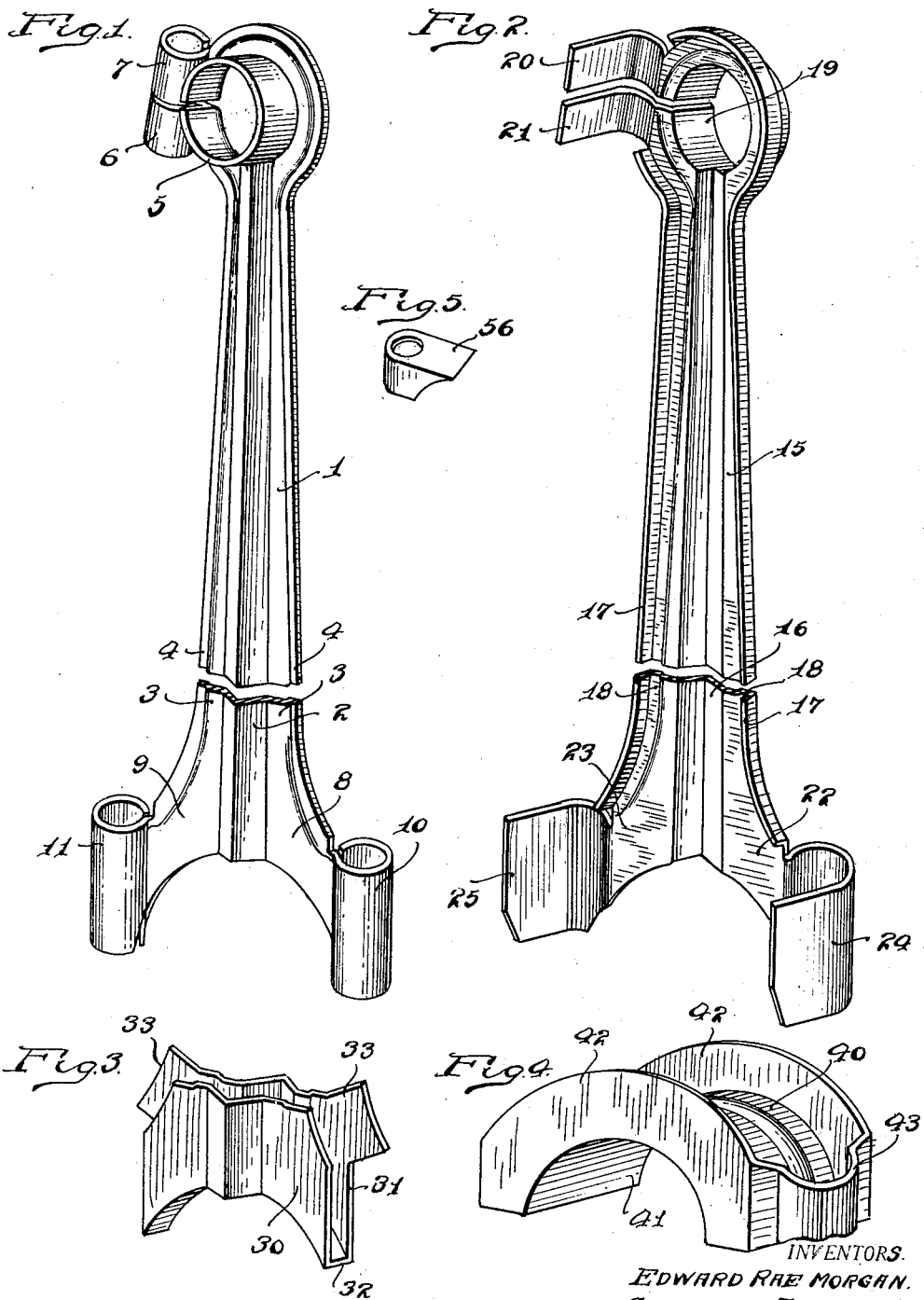
INVENTORS.
EDWARD RAE MORGAN.
BY CHRISTIAN ZUEFLE.
Barnes and Kisselle
ATTORNEYS.

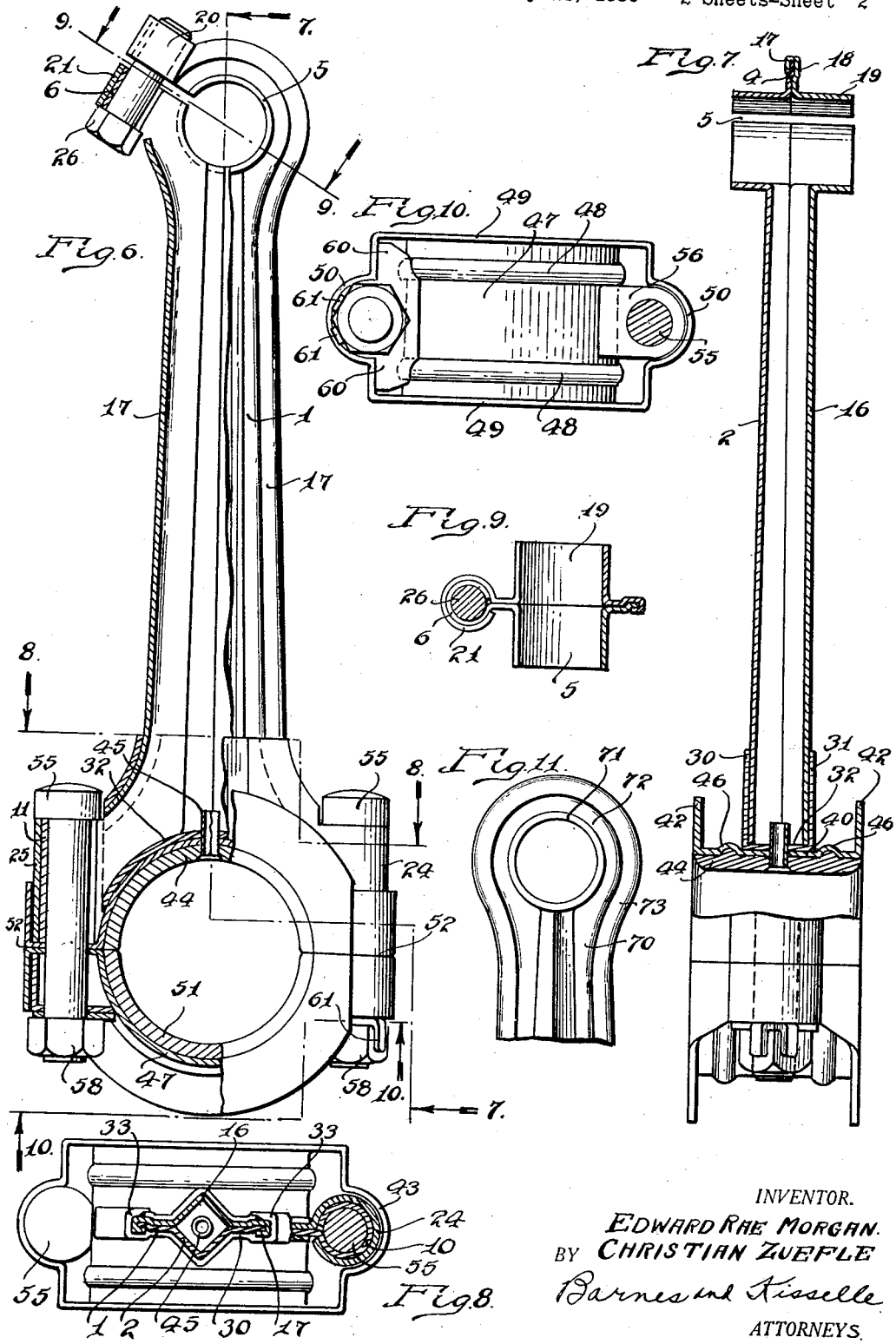

Patented Sept. 27, 1932

1,879,814

UNITED STATES PATENT OFFICE

EDWARD RAE MORGAN AND CHRISTIAN ZUEFLE, OF FLINT, MICHIGAN

CONNECTING ROD

Continuation of application Serial No. 471,343, filed July 28, 1930. This application filed July 8, 1931.
Serial No. 549,465.

This invention relates to a connecting rod fabricated largely from stamped metal parts. Among the objects of the invention is the provision of a rod light in weight yet having great strength. The rod comprises essentially two matching parts arranged to be associated to form the body of the rod and formed from suitably shaped lengths so as to provide in themselves for additional formations at either or both ends of the rod, to the end that separate parts in the assembly are maintained at a minimum. Various parts entering into the fabricated connecting rod may be stampings except for bolts, nuts and the like for bearing attachment purposes, and these stampings may be formed from sheet metal, or in other words, metal of relatively thin gauge. One end of the rod, for the reception of a wrist pin, may have bearing like members formed integrally with the sheet metal body members; and similar bearing members or bearing backs for attachment to a crank shaft or the like at the other end of the rod. It may advantageously be of stampings from sheet metal. The body of the rod may be of hollow tube-like construction for facilitating the strength and at the same time acquiring lightness, and the hollow construction of the body of the rod further facilitates lubrication of the wrist pin at one end of the rod without requiring additional operations for providing a lubricant passageway. Other objects of the invention will become apparent as the detailed description progresses in connection with the accompanying drawings. This application is a continuation of application #471,343, filed July 28, 1930.

Fig. 1 is a perspective view of a blank forming a portion of a rod.

Fig. 2 is a perspective view of a blank for matching that shown in Fig. 1.

Fig. 3 is a perspective view of the reinforcing member for strengthening the end of the rod adjacent the crank shaft bearing end.

Fig. 4 is a perspective of an end part which may advantageously carry a suitable lining of bearing metal.

Fig. 5 is a view of a filler block which may be employed.

Fig. 6 is a view partly in section and with parts cut away illustrating a completed rod structure.

Fig. 7 is a sectional view taken substantially on line 7—7 of Fig. 6.

Fig. 8 is a section taken substantially on line 8—8 of Fig. 6 illustrating structural details at the crank shaft end of the rod.

Fig. 9 is a detailed section taken substantially on line 9—9 of Fig. 6.

Fig. 10 is a section taken on line 10—10 of Fig. 6.

Fig. 11 is a view of the wrist pin and of the rod showing a modified form of structure.

One major member of the connecting rod is shown in Fig. 1 and may comprise a sheet metal member suitably stamped and worked to provide a body portion 1 preferably having an offset central part, as illustrated at 2, on opposite sides of which are edge portions 3. These edge portions may be offset as shown at 4. The offset edges 4 may be provided as the blank is initially formed, or may be provided in a later operation soon to be described. The upper or wrist pin end of the blank is formed with an integral laterally extending bearing member 5, and the edges 4 extend around this member, but the edges and the bearing member 5 may be split as shown. On opposite sides of the split the metal may have integral ears formed circular into hollow boss members 6 and 7. At the opposite end the member 1 has diverging leg portions 8 and 9 with their ends terminating in hollow boss members 10 and 11.

A matching sheet metal blank member, as shown in Fig. 2, and as referenced 15, is preferably provided with an offset portion, as at 16, similar in shape to the offset 2 of member 1, and on opposite sides thereof the edge portions project and the width is greater than that of member 1. These edge portions may be flanged, as at 17, immediately to the rear of which the metal may be depressed as at 18. At the upper end an integral bearing like member 19 is formed extending laterally, and this bearing member may be split as shown with the metal having integral ears 20 and 21. At the opposite end this member has spreading leg portions 22 and 23 terminating in ears 24 and 25. These two members are designed to be matched together, as shown in Figs. 6 and 7, and the flanges 17 fashioned around flanges of member 1. It will be noted that due to the offset 4 and the offset 18, that when the flanges 17 are fashioned around the edge portions 4 that the metal at the extreme edge which comprises three plies of stock is substantially equally distributed to both sides of the center line defining the two halves, as clearly shown in Figs. 8 and 9. Furthermore, this arrangement not only balances the location of metal and weight, but provides for additional rigidity and strength against bending the rod due to the metal offsets. The offset 4 and offset 18 may be provided simultaneously with a die or press operation which fashions the flange 17 around the edges 3, or as shown in Figs. 1 and 2, these offsets may be initially provided in the blanks prior to their fixation to each other.

The members 20 and 21 are fashioned around members 6 and 7, as shown in Fig. 6, and the member 7 may be internally threaded for the reception of a cap screw 26. Thus a wrist pin may be placed in the bearing members 5 and 19 and then clamped therein by the action of the cap screw. Also the wing members 24 and 25 may be fashioned around members 10 and 11 to form bolt receiving bosses as shown in Fig. 6.

Thus the two halves are held securely united entirely around their edges by the flanges 17, and also by reason of the interfitting relation of the hollow boss portions at opposite ends of the rod. To further reinforce the rod and effectively unite the two halves, a reinforcing member may be employed between the bolt-receiving bosses at the crank shaft end of the rod. Such a member may be formed of sheet metal, as shown in Fig. 3, and may comprise a single body of sheet metal fashioned generally U shaped in cross section having spaced sides 30 and 31 connected by a bight portion 32. One side may be provided with integrally projecting ears 33. The bight portion is of curved formation and the spaced sides 30 and 31 are formed so as to correspond in shape to the members 1 and 15. This member may be slipped lengthwise of the rod between the bosses formed by members 10, 11, 24 and 25 until the bight portion 32 abuts against the curved surfaces on the under side of legs 8, 9, 22 and 23, as shown in Fig. 6. The ears 33 may then be fashioned over the upper edges of legs 8, 9, 22 and 23, as shown in Fig. 8. Thus the bight portion 32 effectively clamps together the crank shaft end of the two connecting rod members and prevents tendency for separation. If desirable, the assembly thus far described may be further secured against breakage and separation by uniting the several parts where desired by molten sealing metal, or by welding. For example, the flange 17 may be spot welded at spaced points to unite, respectively, the flange, the intermediate part 4 and the opposing offset 18. Furthermore, the wings 33 after being fashioned as shown in Fig. 8, may be spot welded in place.

This completes the body portion of the connecting rod, but it remains to provide the same with bearing supporting means at one end. For this purpose such a member, as shown in Fig. 4 and referenced 40, may be employed which may be a stamping, of a formation which may be termed box construction, having a curved bottom portion 41 with side walls 42 and end walls 43. The end walls are formed with an outward curve as shown. Suitable bearing metal such as babbitt may be applied directly to this bearing half, as shown at 44, and an oil passageway may be provided through the bottom 40 and through the bearing in which there may be inserted a small tube 45 (see Fig. 6). This bearing member may be positioned onto the rod by being pushed up against the end of the rod until its bottom 40 substantially strikes the bight portion 32 (see Fig. 7). The bottom 40 may be formed with reinforcing corrugations, as shown at 46. In this position the circular portions 43 fit around the bolt bosses as shown in Fig. 8.

Opposing this bearing half is a similar stamping illustrated in Fig. 10 having a curved bottom 47 which may have reinforcing corrugations 48, and which may be of box construction with side walls 49 and end walls of outwardly curved formation, as shown at 50. Suitable bearing metal such as Babbitt metal or the like may be applied directly to this member. This bearing half may then be placed, as shown in Fig. 6, in abutting relation to the bearing half 40. In this position the circular end portions 43 and 50 align with each other. The bottoms of the bearing half of the members on opposite sides of the curved bottom portions 41 and 47 are flattened so that these two members may directly abut each other as at 52. These flattened bottom portions are apertured as shown, for the reception of securing bolts.

Bolts 55 may then be taken through the hollow bosses provided in the body of the rod and through the apertures in the bottom of the bearing halves. A filler block such as shown in Fig. 5 and carrying reference character 56 may be located in the underside of the bearing half 47, as shown in Fig. 10, to provide a surface against which nuts 58 may abut. However, lock washers are preferably used underneath the nuts 58, and these lock washers, such as shown in Fig. 10, may be shaped to have oppositely extending wings 60 which fit inside the walls of the lower bearing half so as to prevent the same from turning. The lock washer may have prongs 61 adapted to be bent against the face of a nut to prevent their turning after assembly.

A modified form of structure is shown in Fig. 11. Here the wrist pin end of the rod is shown of a construction which is not split. One rod-forming member shown at 70 has an integral, laterally extending bearing like member 71, and the edge of member 70, as shown at 72, extends entirely around the bearing 71. The opposing member has its flange 73 clamped around the edge of member 70, and this also extends entirely around the end of the rod circumscribing the bearing 71. In this form a wrist pin may be selected which tightly fits in the bearing formation, and then it may be located therein with a press fit.

It will be seen, therefore, that not only is a fabricated connecting rod, which may be constructed of sheet metal stampings or the like provided, but a minimum number of parts are employed. The bearing metal 44 and 51 may be applied directly to the bearing supporting members thus eliminating the necessity of separately manufacturing and assembling bearings comprising suitable bearing metal each carrying its own back. Heretofore it has been the practice to construct bronze-backed or steel-backed babbitt bearings individually assembled to a connecting rod, whereas in the present case the bearing backs in themselves form part of the connecting rod for supporting the bearing metal. It will be noted by reference to Fig. 7 that the cooperating outwardly formed portions 2 and 16 provide a hollow rod to the end that lubricant may pass through the tube 45 and then up to the wrist pin thus doing away with the problems of drilling a connecting rod to provide a lubricant passageway. Due to the fact that the matched connecting rod halves are securely united to each other at their edges and by bosses formed integrally with the metal, a very strong article is afforded. The two halves are secured together entirely around their edges save for the curved surface between the bolt bosses, but reinforcement is here provided by the clamp member, such as shown in Fig. 3.

We claim:

1. A connecting rod comprising a pair of matched sheet metal members placed together and secured around their edges, said members at one end each having extending parts shaped to form circular hollow bosses, the bosses of one disposed within the bosses of the other, and a sheet metal reinforcing member U shaped in cross section fitted over the ends of the members between the bosses.

2. A connecting rod comprising a pair of matched sheet metal members placed together and secured around their edges, said members at one end each having extending parts shaped to form circular hollow bosses, the bosses of one disposed within the bosses of the other, a sheet metal reinforcing member U shaped in cross section fitted over the ends of the members between the bosses, and ears extending from said reenforcing member and fashioned over the extending portions.

3. A connecting rod comprising a pair of stampings matched together with the edges of the one fashioned over the edges of the other, spaced hollow bosses at one end of the rod formed by sheet metal parts with the sheet metal parts of one disposed within those of the other, and a sheet metal member U shaped in cross section fitting over the ends of the sheet metal member between the bosses with the bight portion substantially abutting the ends of the sheet metal members, and extensions carried by one leg of the U of said member and fashioned over other edges of said members.

4. A connecting rod comprising a pair of matched metal members placed together and secured around their edges, means providing spaced bolt-receiving bosses at one end of the rod, a bearing back having a curved bottom portion and upwardly extending side walls and end walls fitted to the end of the rod with the bosses, said end walls being curved to substantially fit the bosses, a cooperating bearing back abutting the first bearing back, said cooperating bearing back also having curved end walls, and bolts passing through said bosses and the bottoms of the bearing backs.

5. A connecting rod comprising a pair of matched metal members placed together and secured around their edges, means providing spaced bolt-receiving bosses at one end of the rod, a bearing back having a curved bottom portion and upwardly extending side walls and end walls fitted to the end of the rod with the bosses, said end walls being curved to substantially fit the bosses, a cooperating bearing back abutting the first bearing back, said cooperating bearing back also having curved end walls, bolts passing through said bosses and the bottoms of the bearing backs, spacer blocks adjacent the end walls of the second mentioned bearing back, a lock washer fitting over each bolt and having oppositely extending wings engaging the walls of said second named bearing back, and nuts screw threaded on the ends of the bolts.

6. A connecting rod comprising two sheet metal members placed together with the edges of one fashioned over the edges of the other, and said sheet metal members being constructed to form a hollow rod, laterally extending bearing members at one end of the rod into which the hollow rod communicates, means integral with the bearing members forming spaced hollow bolt bosses, a bearing back fitting over said bosses, an aperture through the bearing back, and bearing metal applied directly to the bearing back having an aperture therethrough communicating with the aperture in said bearing back.

7. A connecting rod comprising two sheet metal members placed together with the edges of one fashioned over the edges of the other, and said sheet metal members being constructed to form a hollow rod, laterally extending bearing members at one end of the rod into which the hollow rod communicates, means integral with the bearing members forming spaced hollow bolt bosses, a bearing back fitting over said bosses, an aperture through the bearing back, bearing metal applied directly to the bearing back having an aperture therethrough communicating with the aperture in said bearing back, an opposing bearing back having bearing metal applied directly thereto, and bolt means passing through the bosses and bearing backs.

8. A connecting rod comprising two sheet metal members placed together and secured around their edges, said members being shaped to form a wrist pin-receiving bearing at one end, spaced bolt bosses at the other end of the rod formed by metal parts integral with the two metal members, a box shaped bearing back having bearing metal applied directly thereto and fitted around the bosses, another and inverted bearing back of box formation abutting the first bearing back, and bolts extending through said bosses and said bearing backs.

9. A connecting rod comprising a stamping with a laterally extending bearing portion at one end, said portion being split, ears projecting from the metal on opposite sides of the split and fashioned into hollow bosses, another sheet metal member secured to the first and having a laterally extending split bearing member, ears projecting therefrom on opposite sides of the split and fashioned into hollow bosses around the first mentioned boss, and a bolt or the like extending through the bosses and adapted to contract the bearing members around a wrist pin or the like.

In testimony whereof we affix our signatures.

EDWARD RAE MORGAN.
CHRISTIAN ZUEFLE.